US010148953B2

(12) United States Patent
Budagavi

(10) Patent No.: US 10,148,953 B2
(45) Date of Patent: Dec. 4, 2018

(54) SYSTEM AND METHOD FOR INTRA PREDICTION IN VIDEO CODING

(71) Applicant: Samsung Electronics Co., Ltd., Suwon-si, Gyeonggi-do (KR)

(72) Inventor: Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 576 days.

(21) Appl. No.: 14/843,528

(22) Filed: Sep. 2, 2015

(65) Prior Publication Data

US 2016/0134866 A1 May 12, 2016

Related U.S. Application Data

(60) Provisional application No. 62/077,802, filed on Nov. 10, 2014.

(51) Int. Cl.

*H04N 19/13* (2014.01)
*H04N 19/18* (2014.01)
*H04N 19/11* (2014.01)
*H04N 19/176* (2014.01)
*H04N 19/80* (2014.01)
*H04N 19/86* (2014.01)
*H04N 19/44* (2014.01)

(52) U.S. Cl.

CPC .......... *H04N 19/11* (2014.11); *H04N 19/176* (2014.11); *H04N 19/80* (2014.11); *H04N 19/86* (2014.11); *H04N 19/44* (2014.11)

(58) Field of Classification Search

CPC ...... H04N 19/11; H04N 19/176; H04N 19/80; H04N 19/86; H04N 19/44

See application file for complete search history.

(56) References Cited

U.S. PATENT DOCUMENTS

2012/0082224 A1* 4/2012 Van Der Auwera ........................ H04N 19/176 375/240.12

2012/0250766 A1 10/2012 Wu et al.

(Continued)

FOREIGN PATENT DOCUMENTS

EP 2712192 A2 3/2014

OTHER PUBLICATIONS

Lainema et al. (Chapter 4 Intra-Picture Prediction in HEVC "In:" High Efficiency Video Coding (HEVC) Aug. 1, 2014 (Aug. 1, 2014), Springer International Publishing, XP055292569, ISBN: 978-3-319-06894-7 vol. 29, pp. 91-112, DOI: 10.1007/978-3-319-06895-5_4).*

(Continued)

*Primary Examiner* — Jessica M Prince
*Assistant Examiner* — Patrick E Demosky

(57) ABSTRACT

A user equipment includes a transceiver and a decoder. The transceiver is configured to receive an encoded bitstream of video. The decoder includes processing circuitry. The decoder is configured to identify a first intra mode associated with a top prediction unit (PU) in relation to a current PU of the encoded bitstream of video. The decoder is also configured to identify a second intra mode associated with a left PU in relation to the current PU. The decoder is also configured to determine a plurality of most probable modes (MPMs) based on the first intra mode and the second intra mode, wherein a number of modes is greater than thirty-five.

18 Claims, 13 Drawing Sheets

700

START
702
ModeA != ModeB
No
Yes
MPM[0] = ModeA
MPM[1] = ModeB
710
712
ModeA != PLANAR
ModeB != PLANAR
No
716
ModeA != DC
ModeB != DC
No
720
MPM[2] = Mode50
Yes 714
MPM[2] = PLANAR
Yes
MPM[2] = DC
718
704
ModeA < 2
Yes
No 706
MPM[0] = ModeA
MPM[1] = 2 + ((ModeA + 61) % 64)
MPM[2] = 2 + ((ModeA - 1) % 64)
708
MPM[0] = PLANAR
MPM[1] = DC
MPM[2] = Mode50

(56) References Cited

U.S. PATENT DOCUMENTS

2013/0114707 A1* 5/2013 Seregin .................. H04N 19/11 375/240.12
2014/0119439 A1 5/2014 Guo et al.
2014/0133558 A1 5/2014 Seregin et al.

OTHER PUBLICATIONS

Lainema et al. (Chapter 4 Intra-Picture Prediction in HEVC "In:" High Efficiency Video Coding (HEVC) Aug. 1, 2014 (Aug. 1, 2014), Springer International Publishing, XP055292569, ISBN: 978-3-319-06894-7 vol. 29, pp. 91-112, DOI: 10.1007/978-3-319-06895-5_4) (Year: 2014).*
International Search Report dated Jan. 12, 2016 in connection with International Application PCT/KR2015/009889; 4 pages.
Written Opinion dated Jan. 12, 2016 in connection with International Application PCT/KR2015/009889; 5 pages.
European Patent Office, "Supplementary Partial European Search Report," Application No. EP 15 85 8700, dated Sep. 12, 2017, 11 pages.
European Patent Office, "Supplementary European Search Report," Application No. 15 85 8700, dated Nov. 28, 2017, 16 pages.
Hisilicon Technologies, "Improving the Intra Prediction Based on a Uniform Probability Model," Document: JCTVC-G374, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 11 pages.
Lainema, Jani, et al., "Intra Coding of the HEVC Standard," IEEE Transactions on Circuits and Systems for Video Technology, vol. 22, No. 12, Dec. 2012, 10 pages.
Lainema, Jani, et al., "Chapter 4: Intra-Picture Prediction in HEVC," in "High Efficiency Video Coding (HEVC)," Springer International Publishing, vol. 29, Aug. 1, 2014, ISBN: 978-3-319-06894-7, 22 pages.
Matsuda, Ichiro, et al., "Interpolative Intra Prediction by Adapting Processing Order in Block-Based Image Coding," 2013 IEEE International Conference on Image Processing, IEEE, Sep. 15, 2013, 5 pages.
Mitsubishi Electric Corporation, et al., "LUT-based adaptive filtering on intra prediction samples," Document: JCTVC-D109, Joint Collaborative Team on Video Coding (JCT-VC) of ITU-T SG16 WP3 and ISO/IEC JTC1/SC29/WG11, 4th Meeting: Daegu, KR, Jan. 20-28, 2011, 4 pages.
Qualcomm Incorporated, "Further improvements to HMKTA-1.0," Document VCEG-AZ07, ITU—Telecommunications Standardization Sector, Study Group 16 Question 6, Video Coding Experts Group (VCEG), 52nd Meeting: Warsaw, Poland, Jun. 19-26, 2015, 8 pages.

* cited by examiner

600

1100

SYSTEM AND METHOD FOR INTRA PREDICTION IN VIDEO CODING

CROSS-REFERENCE TO RELATED APPLICATION(S) AND CLAIM OF PRIORITY

The present application is related to U.S. Provisional Patent Application No. 62/077,802, filed Nov. 10, 2014, entitled "METHODS FOR INTRA PREDICTION IN VIDEO CODING." Provisional Patent Application No. 62/077,802 is hereby incorporated by reference into the present application as if fully set forth herein. The present application hereby claims priority under 35 U.S.C. § 119(e) to U.S. Provisional Patent Application No. 62/077,802.

TECHNICAL FIELD

The present application relates generally to video coding and, more specifically, to intra prediction in video coding.

BACKGROUND

Intra prediction exploits spatial correlation within a picture or within a picture region. In order to improve coding efficiency, the High-Efficiency Video Coding (HEVC) standard exploits block-based spatial prediction extensively. In HEVC, multiple Intra prediction modes are used to exploit spatial features. The size of the Prediction Unit (PU) for Intra coding can be 32×32, 16×16, 8×8, or 4×4. The number of Intra prediction modes is 35, which includes 33 directional prediction modes, one DC mode and one planar mode.

Intra prediction in video coding standards such as AVC and HEVC consist of predicting the samples in the current block from already reconstructed left and top neighboring samples, referred to as reference samples. HEVC intra prediction uses angular prediction with thirty-three angles to predict the samples in the current block along the direction of one of the thirty-three angles. In addition depending on the block size and the angle of the prediction, the reference samples are smoothed using a [1 2 1]/4 filter to provide a smoothly varying prediction signal.

SUMMARY

A first embodiment of this disclosure provides a user equipment includes a transceiver and a decoder. The transceiver is configured to receive an encoded bitstream of video. The decoder includes processing circuitry. The decoder is configured to identify a first intra mode associated with a top prediction unit (PU) in relation to a current PU of the encoded bitstream of video. The decoder is also configured to identify a second intra mode associated with a left PU in relation to the current PU. The decoder is also configured to determine a plurality of most probable modes (MPMs) based on the first intra mode and the second intra mode, wherein a number of modes is greater than thirty-five.

A second embodiment of this disclosure provides a method for decoding a bitstream of video. The method includes receiving an encoded bitstream of video. The method also includes identifying a first intra mode associated with a top prediction unit (PU) in relation to a current PU of the encoded bitstream of video. The method also includes identifying a second intra mode associated with a left PU in relation to the current PU. The method also includes determining a plurality of most probable modes (MPMs) based on the first intra mode and the second intra mode, wherein a number of modes is greater than thirty-five.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

This disclosure describes various embodiments for improved methods for intra prediction in video coding. One or more embodiments of this disclosure provide an improved method by using finer angles, adaptive angles that are signaled on a picture/slice/tiles/region basis, improved entropy coding of angular mode information, and longer and stronger intra smoothing filter for larger block sizes (16×16 and 32×32).

One or more embodiments of this disclosure recognize and take into account that the improving Intra coding efficiency can be more difficult when compared to achieving Inter coding gains (e.g. as evidenced by the 20+% gain of HEVC vs AVC in All Intra as compared to 35+% gain of HEVC vs AVC in Inter coding). This disclosure describes various embodiments for achieving at least greater average bitrate savings (sum of coding gains of individual tools presented in this invention) over state-of-the-art HEVC video codec under All Intra coding conditions on 1080p, 4K, and 8K video sequences. On 8K video sequences (which is a key target use case for next-generation video coding), the average bitrate savings is at least greater (sum of coding gains of individual tools presented in this invention) under All Intra test conditions when compared to HEVC.

Figure 1:
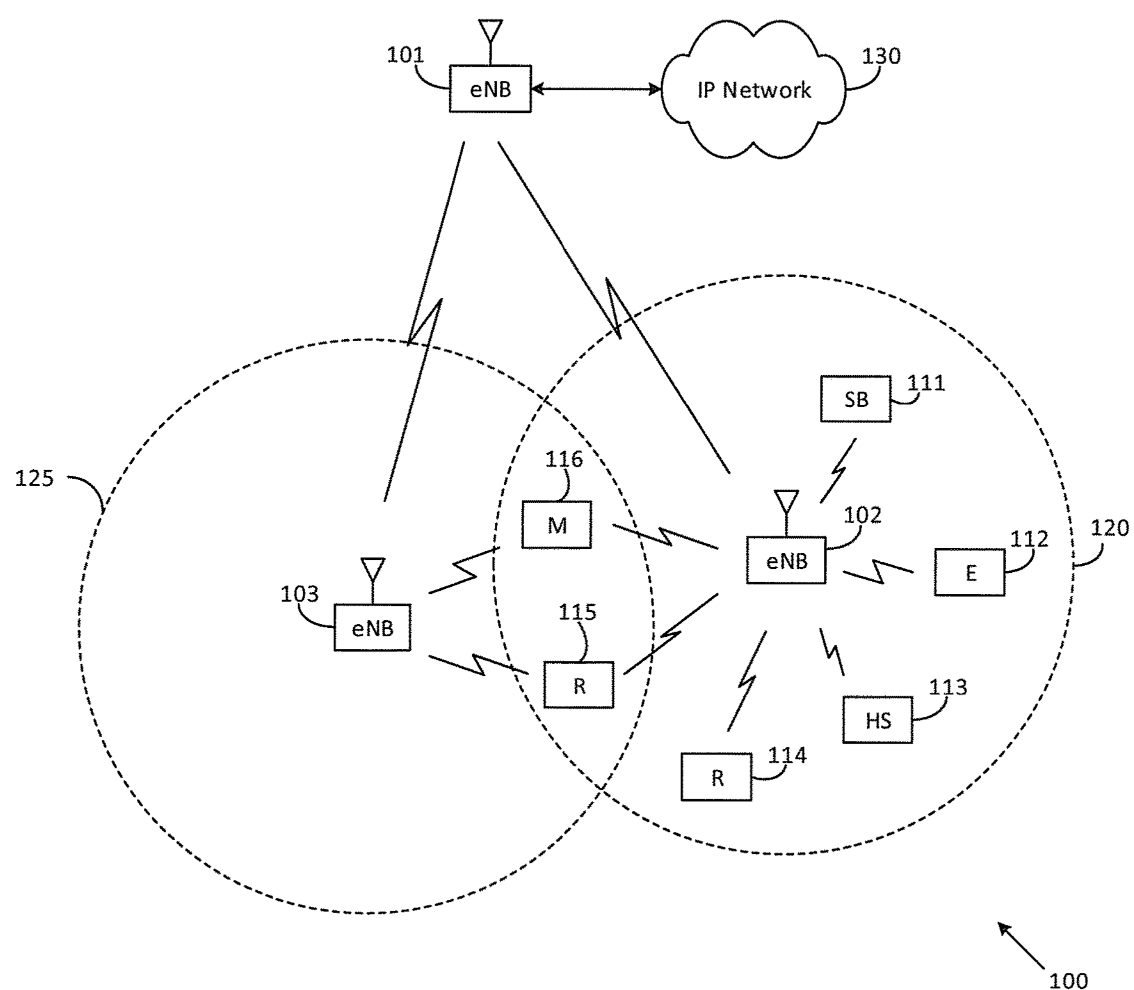
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
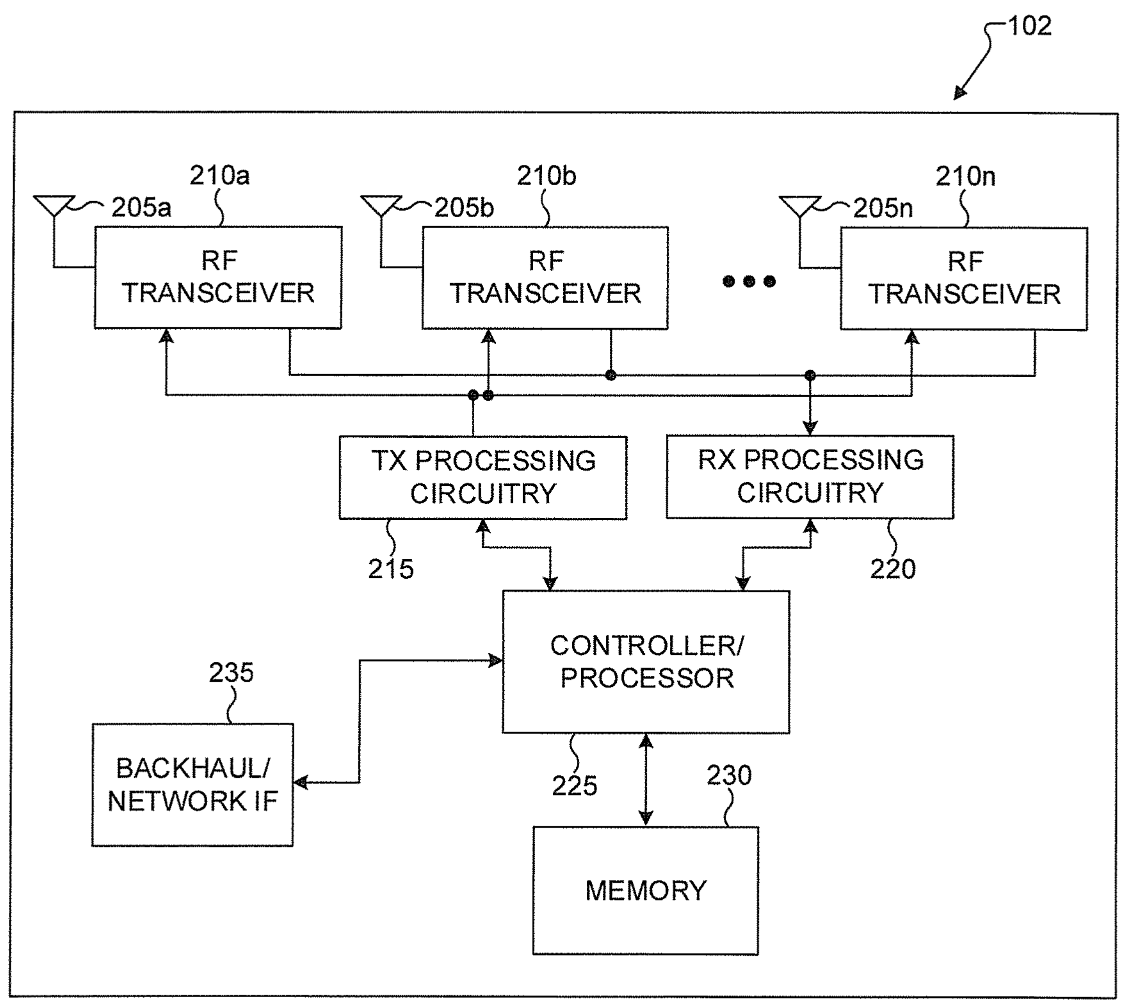
FIG. 2 illustrates an example eNodeB (eNB) according to this disclosure.

FIG. 2 illustrates an example eNB 102 according to this disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas **205*a*-205*n*, multiple RF transceivers 210*a*-210*n*, transmit (TX) processing circuitry 215, and receive (RX) processing circuitry 220. The eNB 102 also includes a controller/processor 225, a memory 230, and a backhaul or network interface 235**.

The RF transceivers **210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225** for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers **210*a*-210*n* receive the outgoing processed baseband or IF signals from the TX processing circuitry 215 and up-converts the baseband or IF signals to RF signals that are transmitted via the antennas 205*a*-205*n***.

The controller/processor 225 can include one or more processors or other processing devices that control the overall operation of the eNB 102. For example, the controller/processor 225 could control the reception of forward channel signals and the transmission of reverse channel signals by the RF transceivers **210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205***a*-205*n* are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller.

The controller/processor 225 is also capable of executing programs and other processes resident in the memory 230, such as a basic OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

Figure 3:
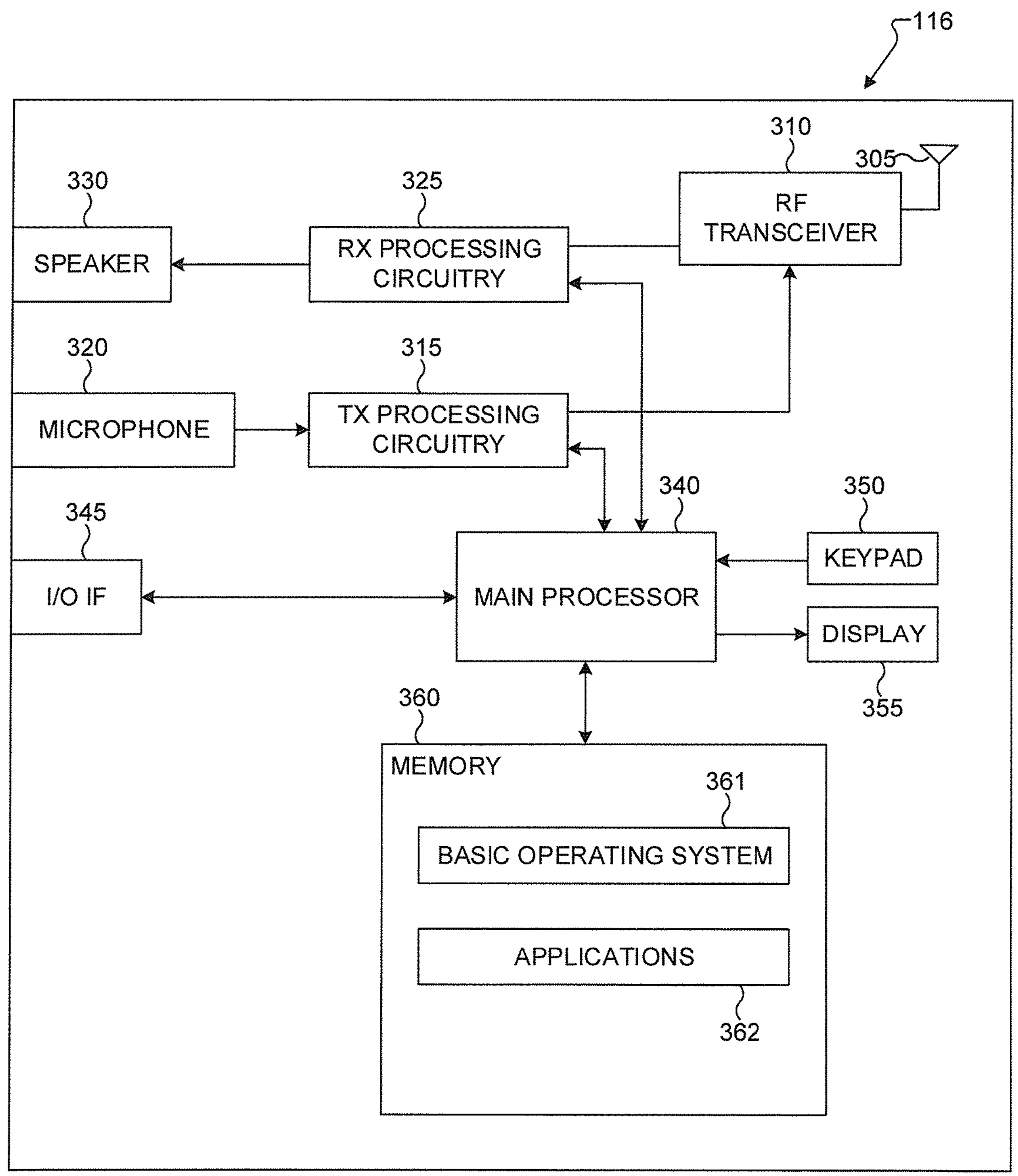
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
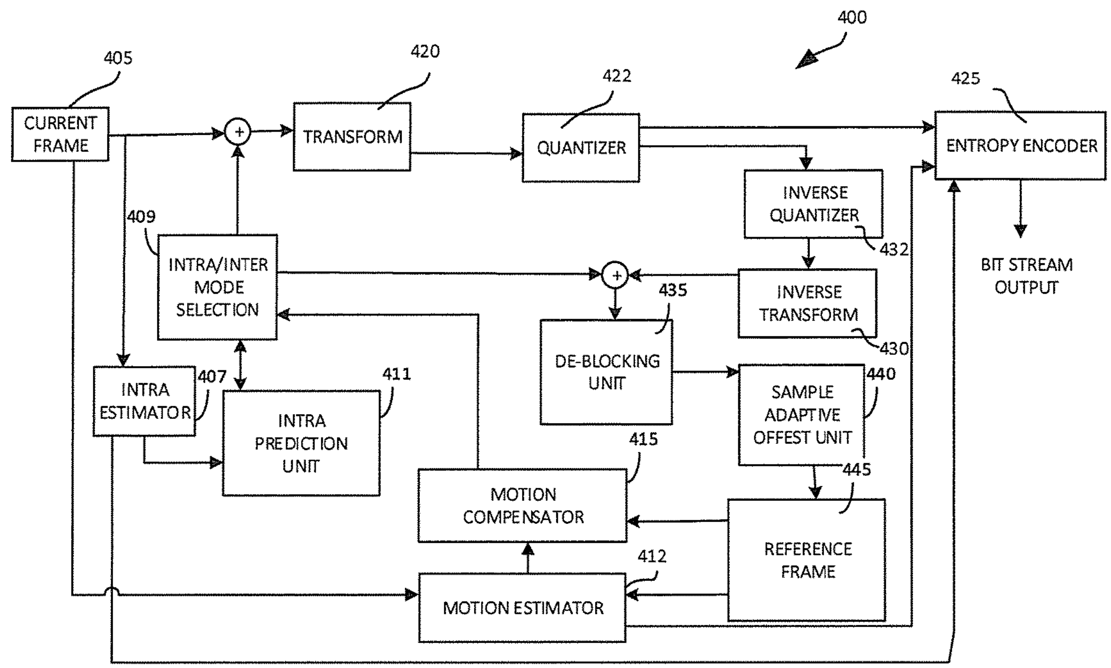
FIG. 4A illustrates an example video encoder according to embodiments of the disclosure.

FIG. 4A illustrates an example video encoder 400 according to embodiments of the present disclosure. The embodiment of the encoder 400 shown in FIG. 4A is for illustration only. Other embodiments of the encoder 400 could be used without departing from the scope of this disclosure.

As shown in FIG. 4A, the encoder 400 can be based on a coding unit. A intra estimator 407 and intra-prediction unit 411 can perform intra prediction on prediction units of the intra mode in a current frame 405. A motion estimator 412 and a motion compensator 415 can perform inter prediction and motion compensation, respectively, on prediction units of the inter-prediction mode using the current frame 405 and a reference frame 445. The intra/inter mode selection unit 409 can select between the intra-prediction unit 411 and motion compensator 415. Residual values can be generated based on the prediction units output from the intra estimator 407, intra-prediction unit 411, the motion estimator 412, and the motion compensator 415. The generated residual values can be output as quantized transform coefficients by passing through a transform unit 420 and a quantizer 422.

The quantized transform coefficients can be restored to residual values by passing through an inverse quantizer 432 and an inverse transform unit 430. The restored residual values can be post-processed by passing through a de-blocking unit 435 and a sample adaptive offset unit 440 and output as the reference frame 445. The quantized transform coefficients can be output as a bitstream 427 by passing through an entropy encoder 425.

Figure 4B:
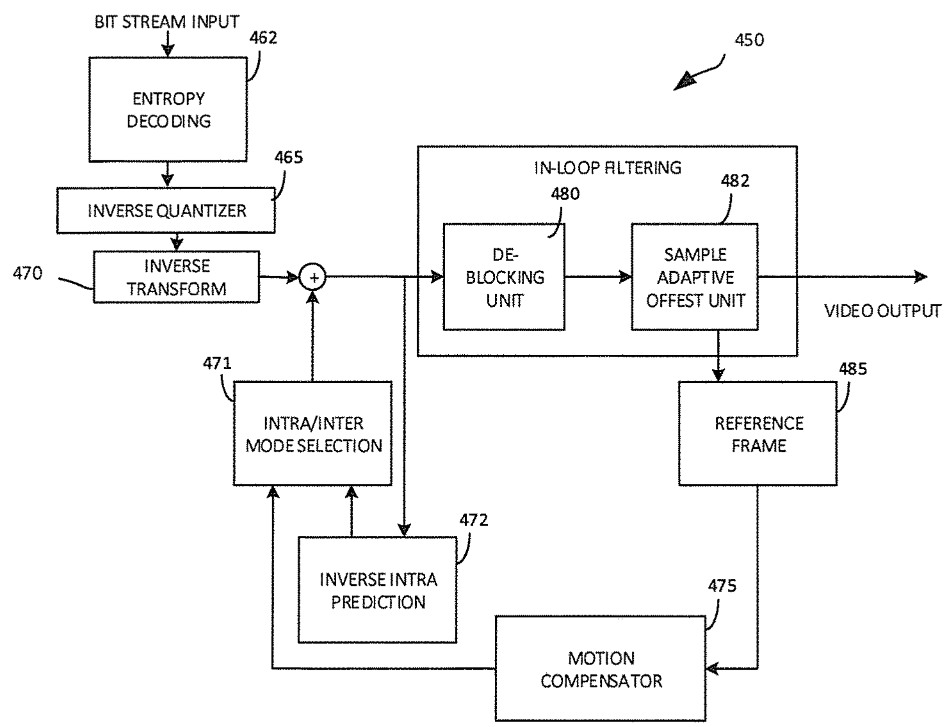
FIG. 4B illustrates an example video decoder according to embodiments of the disclosure.

FIG. 4B illustrates an example video decoder 450 according to embodiments of the present disclosure. The embodiment of the decoder 450 shown in FIG. 4B is for illustration only. Other embodiments of the decoder 450 could be used without departing from the scope of this disclosure.

As shown in FIG. 4B, the decoder 450 can be based on a coding unit. A bitstream with encoded image data can be output as inverse-quantized data by passing through an entropy decoder 462 and an inverse quantizer 465 and restored to residual values by passing through an inverse transform unit 470. The residual values can be restored according to rectangular block coding units by being added to an intra-prediction result of an intra-prediction unit 472 or a motion compensation result of a motion compensator 475. The intra/inter mode selection unit 473 can select between the intra-prediction unit 472 and motion compensator 475. The restored coding units can be used for prediction of next coding units or a next frame by passing through a de-blocking unit 480 and a sample adaptive offset unit 482. To perform decoding, components of the image decoder 450 (such as the entropy decoder 462, the inverse quantizer 465, the inverse transform unit 470, the intra prediction unit 472, the motion compensator 475, the de-blocking unit 480, and the sample adaptive offset unit 482) can perform an image decoding process.

Each functional aspect of the encoder 400 and decoder 450 will now be described.

Intra-Prediction (units 411 and 472): Intra-prediction utilizes spatial correlation in each frame to reduce the amount of transmission data necessary to represent a picture. Intra-frame is essentially the random access point. The first frame is an Intra-frame and additional frames can be Intra-frames as well to provide random access capability—e.g rewind and fast forward. Additionally, there can be some intra blocks in an inter frame. Intra-prediction is associated with making predictions within a frame, whereas inter-prediction relates to making predictions between frames.

Motion Estimation (unit 412): A concept in video compression is to store only incremental changes between frames when inter-prediction is performed. The differences between blocks in two frames can be extracted by a motion estimation tool. Here, the current block to be coded is reduced to a set of motion vectors and inter-prediction residues.

Motion Compensation (units 415 and 475): Motion compensation can be used to decode an image that is encoded by motion estimation. This reconstruction of an image is performed from received motion vectors and a block in a reference frame.

Transform/Inverse Transform (units 420, 430, and 470): A transform unit can be used to compress an image in inter-frames or intra-frames. One commonly used transform is the Discrete Cosine Transform (DCT).

Quantization/Inverse Quantization (units 422, 432, and 465): A quantization stage can reduce the amount of information by dividing each transform coefficient by a particular number to reduce the quantity of possible values that each transform coefficient value could have. Because this makes the values fall into a narrower range, this allows entropy coding to express the values more compactly.

De-blocking and Sample adaptive offset units (units 435, 440, and 482): De-blocking can remove encoding artifacts due to block-by-block coding of an image. A de-blocking filter acts on boundaries of image blocks and removes blocking artifacts. A sample adaptive offset unit can minimize ringing artifacts.

In FIGS. 4A and 4B, portions of the encoder 400 and the decoder 450 are illustrated as separate units. However, this disclosure is not limited to the illustrated embodiments. Also, as shown here, the encoder 400 and decoder 450 include several common components. In some embodiments, the encoder 400 and the decoder 450 may be implemented as an integrated unit, and one or more components of an encoder may be used for decoding (or vice versa). Furthermore, each component in the encoder 400 and the decoder 450 could be implemented using any suitable hardware or combination of hardware and software/firmware instructions, and multiple components could be implemented as an integral unit. For instance, one or more components of the encoder 400 or the decoder 450 could be implemented in one or more field programmable gate arrays (FPGAs), application specific integrated circuits (ASICs), microprocessors, microcontrollers, digital signal processors, or a combination thereof.

Figure 5:
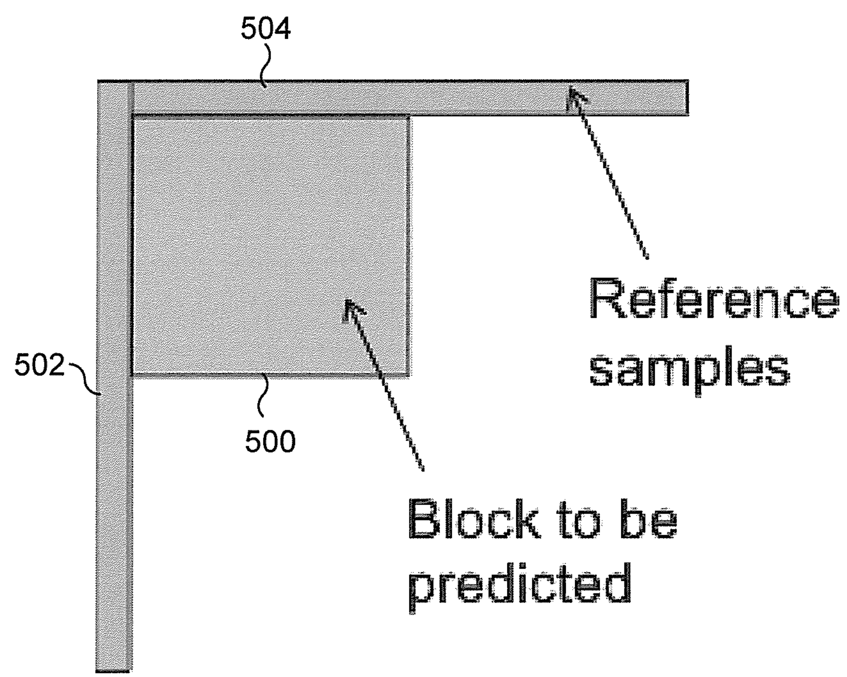
FIG. 5 illustrates a block for intra prediction coding according to embodiments of the present disclosure.

FIG. 5 illustrates a block 500 for intra prediction coding according to embodiments of the present disclosure. The embodiment of the block 500 shown in FIG. 2 is for illustration only. Other embodiments of the block 500 could be used without departing from the scope of this disclosure. Intra prediction in video coding standards, such as AVC and HEVC, consists of predicting the samples in the block 500 from neighboring already reconstructed left 502 and top 504 samples, also referred to as reference samples.

HEVC intra prediction uses angular prediction with 33 angles to predict the samples in the block 500 along the direction of one of the 33 angles. In addition depending on the block size and the angle of the prediction, the reference samples are smoothed using a [1 2 1]/4 filter to provide a smoothly varying prediction signal.

Figure 6:
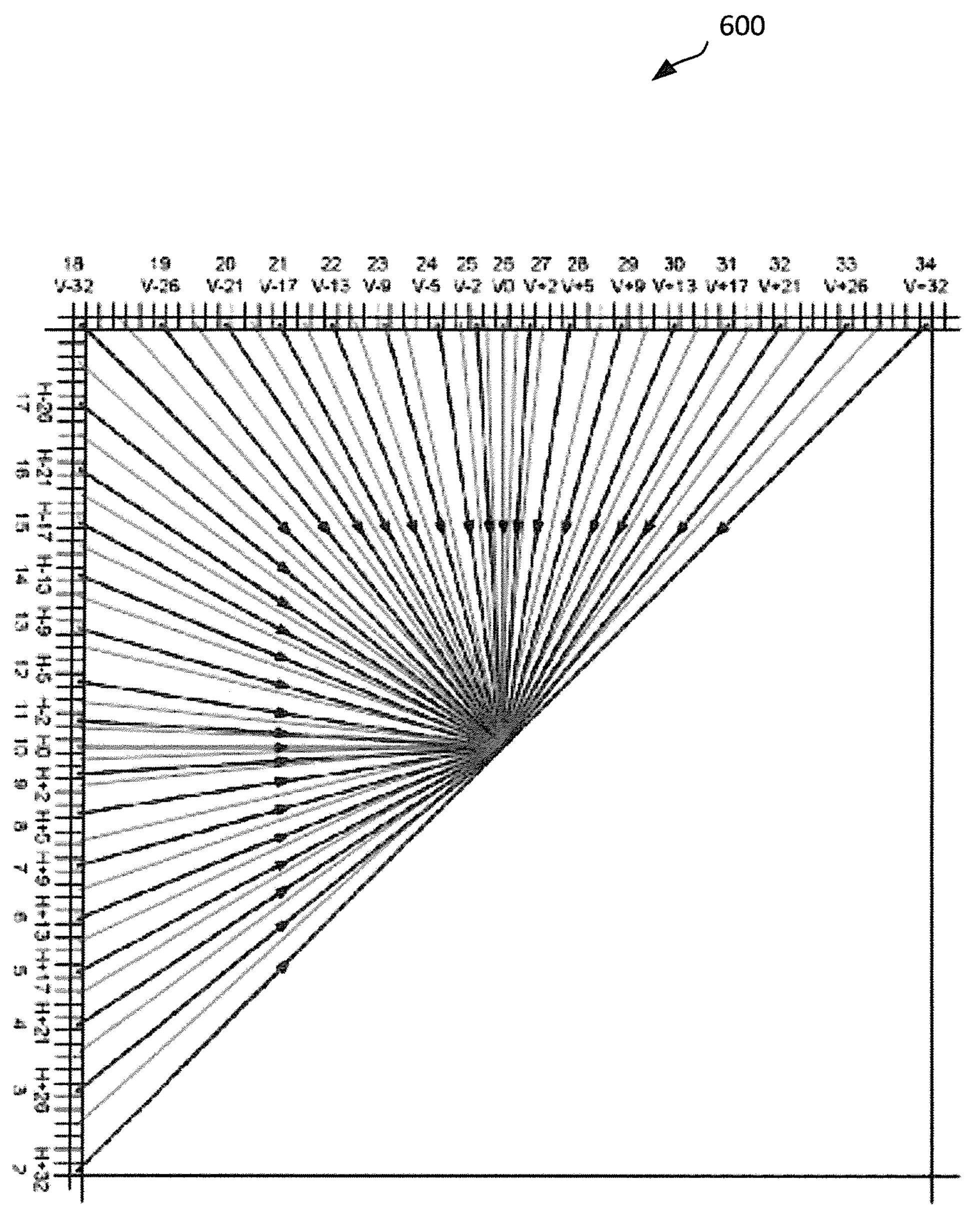
FIG. 6 illustrates intra prediction angles according to embodiments of the present disclosure.

FIG. 6 illustrates intra prediction angles 600 according to embodiments of the present disclosure. The embodiment of intra prediction angles 600 shown in FIG. 6 is for illustration only. Other embodiments of intra prediction angles 600 could be used without departing from the scope of this disclosure.

As shown in FIG. 6, the unified angular prediction (UAP) is shown for HEVC. The intra prediction angles 600 include a vertical mode 26 and a horizontal mode 10. HEVC uses a total of thirty-three angular directions. Various embodiments of this disclosure use more than thirty-three angular directions. The intra prediction angles 600 include sixty-five angular directions The intra prediction angles 600 include angular directions used in HEVC (black lines) and the additional angular directions (red lines) used in one or more embodiments of this disclosure.

Table 1 lists the angular directions used by HEVC.

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 21 | 17 | 13 | 9 | 5 | 2 | 0 | −2 | −5 | −9 | −13 | −17 | −21 | −26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | −32 | −26 | −21 | −17 | −13 | −9 | −5 | −2 | 0 | 2 | 5 | 9 | 13 | 17 | 21 | 26 | 32 |

In Table 1, predModeIntra is the intra prediction mode that is signaled to the decoder and intraPredAngle is the corresponding angle.

Table 2 lists an example of angles used in the embodiments of this disclosure.

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 21 | 19 | 17 | 15 | 13 | 11 | 9 | 7 | 5 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | −1 | −2 | −3 | −5 | −7 | −9 | −11 | −13 | −15 | −17 | −19 | −21 | −23 | −26 | −29 | −32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | −29 | −26 | −23 | −21 | −19 | −17 | −15 | −13 | −11 | −9 | −7 | −5 | −3 | −2 | −1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 5 | 7 | 9 | 11 | 13 | 15 | 17 | 19 | 21 | 23 | 26 | 29 | 32 | | |

The predicted samples can be calculated using bilinear interpolation as in HEVC with increased precision when the number of angles is greater than sixty-four. HEVC uses the following equations to do bilinear interpolation with fractional pixel resolution of 1/32:

```
// refMain is the reference samples array from which the current block is
predicted
// deltaPos is the project displacement on row k along the direction
of intraPredAngle
deltaInt = deltaPos >> 5;
deltaFract = deltaPos & (32 − 1);
// Do linear filtering
for (l=0;l<blkSize;l++)
{
        refMainIndex      = l+deltaInt+1;
        pDst[k*dstStride+l] = (Pel) ( ((32−deltaFract) *
refMain[refMainIndex] + deltaFract * refMain[refMainIndex+
1]+16) >> 5 );
}
```

One or more embodiments include finer angles intra mode signaling.

Since the number of angles increases, the number of intra modes increases. Hence the signaling of intra mode needs to be changed too.

Figure 7:
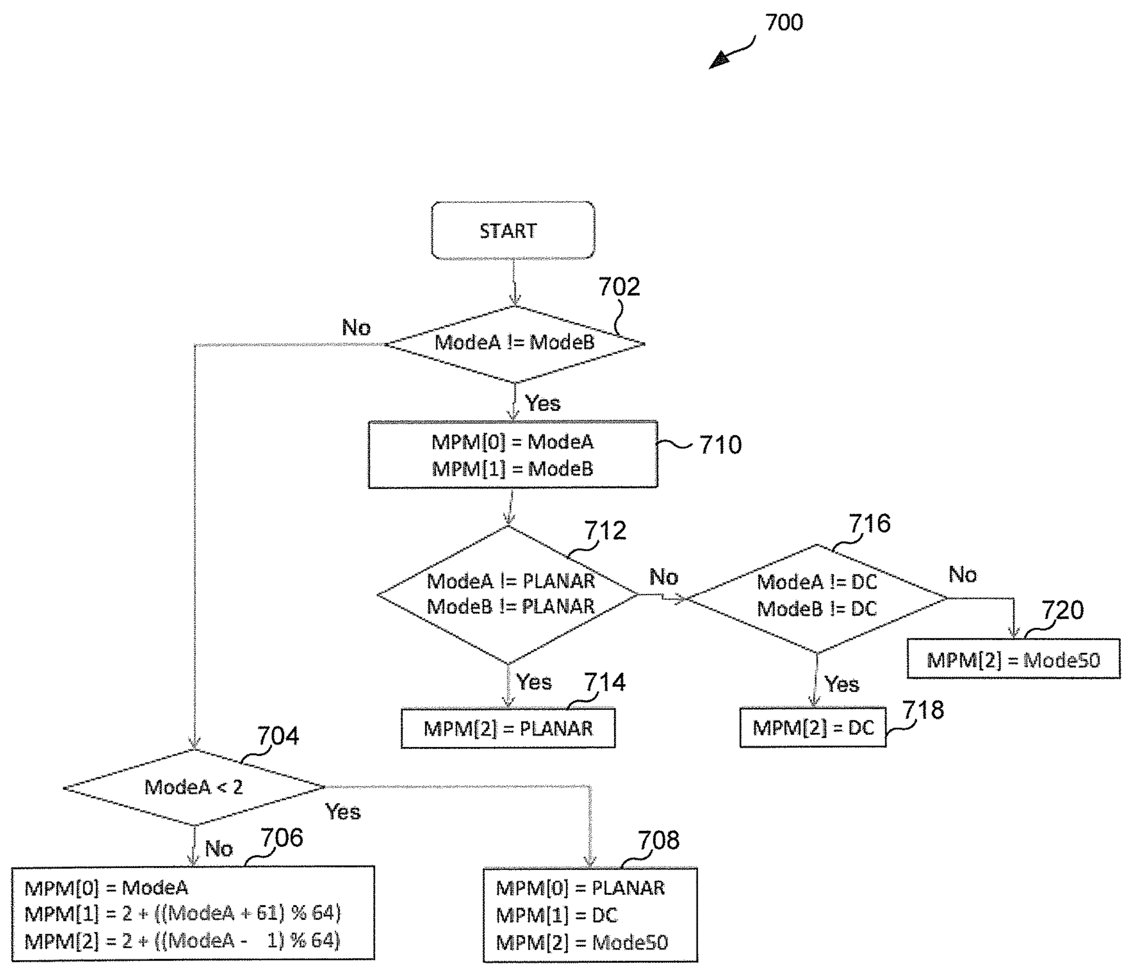
FIG. 7 illustrates a process for determining a most probable mode (MPM) according to embodiments of the present disclosure.

FIG. 7 illustrates a process 700 for determining a most probable mode (MPM) according to embodiments of the present disclosure. The embodiment of process 700 shown in FIG. 7 is for illustration only. Other embodiments of process 700 could be used without departing from the scope of this disclosure.

In HEVC, the intra mode of the current block is predicted from the intra modes of the neighboring blocks. Three most probable modes (MPM) can be defined using neighboring intra modes. ModeA is the intra mode of a block to the left of the current block and ModeB is the intra mode of a block above the current block. Various embodiments of this disclosure modify the MPM determination and intra mode transmission logic to handle a greater number of angles.

In FIG. 7, at operation 702, a processor determines whether ModeA is not equal to ModeB. If ModeA is equal to ModeB, at operation 704, the processor determines whether ModeA or ModeB is less than two. If ModeA or ModeB is equal or greater than two, at operation 706, the MPMs are determined as: MPM[0]=ModeA; MPM[1]=2+((ModeA+61)%64); MPM[2]=2+((ModeA−1)%64). If ModeA or ModeB is less than two, at operation 708, the MPMs are determined as: MPM[0] planar; MPM[1]=DC; MPM[2]=Mode50.

If, at operation 702, ModeA is not equal to ModeB, then at operation 710, the processor determines MPM[0] as ModeA and MPM[1] as ModeB. Then, at operation 712, the processor determines whether ModeA and ModeB are a planar mode. If neither ModeA and ModeB are a planar mode, at operation 714, the processor determines MPM[2] as a planar mode.

If one of ModeA or ModeB is a planar mode, at operation 716, the processor determines whether ModeA and ModeB are a DC mode. If neither ModeA and ModeB are a DC mode, at operation 718, the processor determines MPM[2] as a DC mode. If one of ModeA or ModeB is a DC mode, at operation 720, the processor determines MPM[2] as Mode50.

Figure 8:
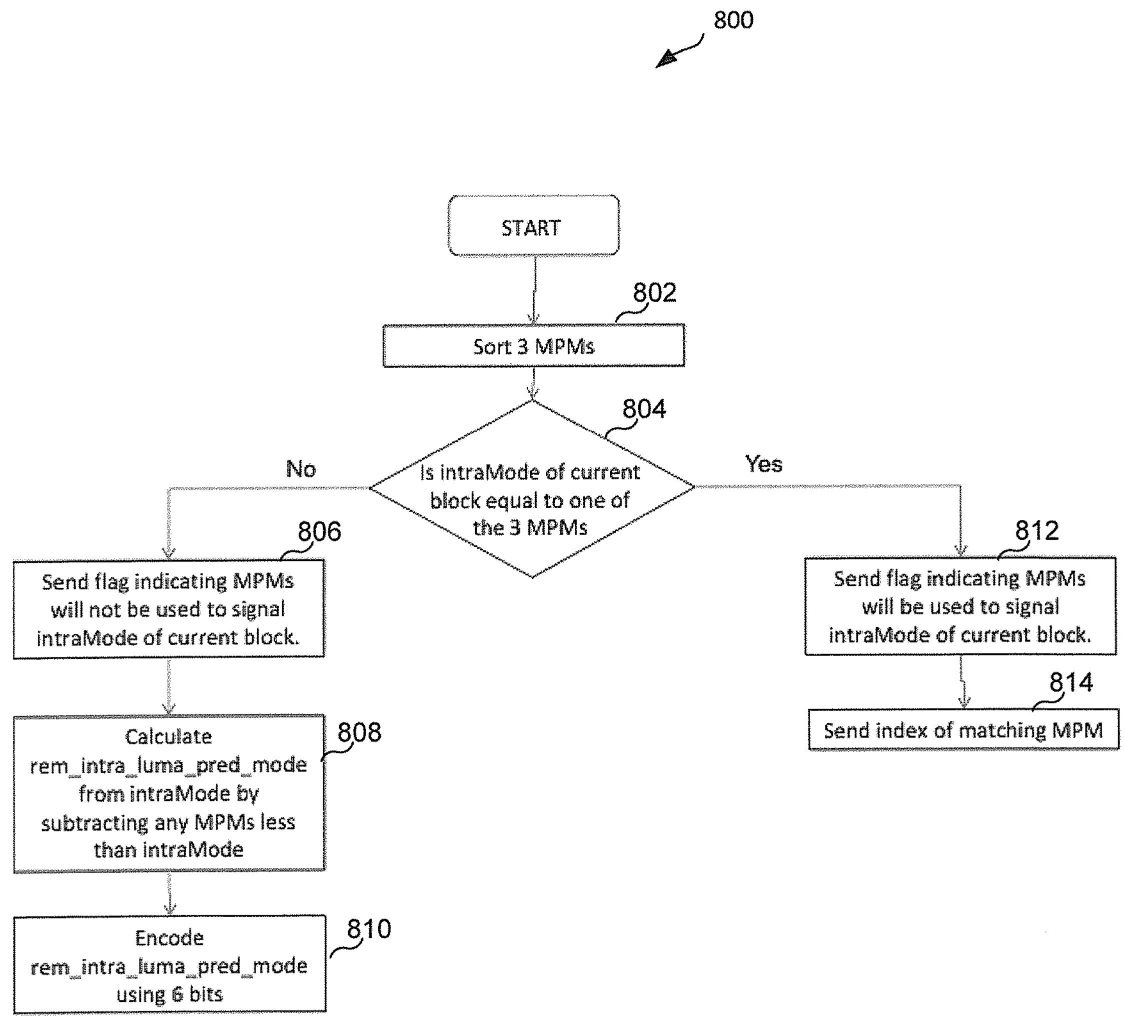
FIG. 8 illustrates a process for intra mode signaling supporting sixty-five angles according to embodiments of the present disclosure.

FIG. 8 illustrates a process 800 for intra mode signaling supporting sixty-five angles according to embodiments of the present disclosure. The embodiment of process 800 shown in FIG. 8 is for illustration only. Other embodiments of process 800 could be used without departing from the scope of this disclosure.

In FIG. 8, at operation 802, a processor sorts three MPMs. At operation 804, the processor determines whether the intra mode of the current block is equal to one of the three MPMs. If the intra mode of the current block is not equal to one of the three MPMs, at operation 806, the processor controls a transceiver to send a flag indicating that MPMs will not be used to signal an intra mode of the current block. At operation 808, the processor determines a rem_intra_luma_pred_mode, the luma intra mode, from the intra mode by subtracting any MPMs less than the intra mode. At operation 810, the processor encodes the rem_intra_luma_pred_mode using six bits.

At operation 804, if the intra mode of the current block is equal to one of the three MPMs, at operation 812, the processor controls a transceiver to send a flag indicating that MPMs will be used to signal an intra mode of the current block. At operation 814, the processor controls a transceiver to send an index of matching MPMs.

Figure 9:
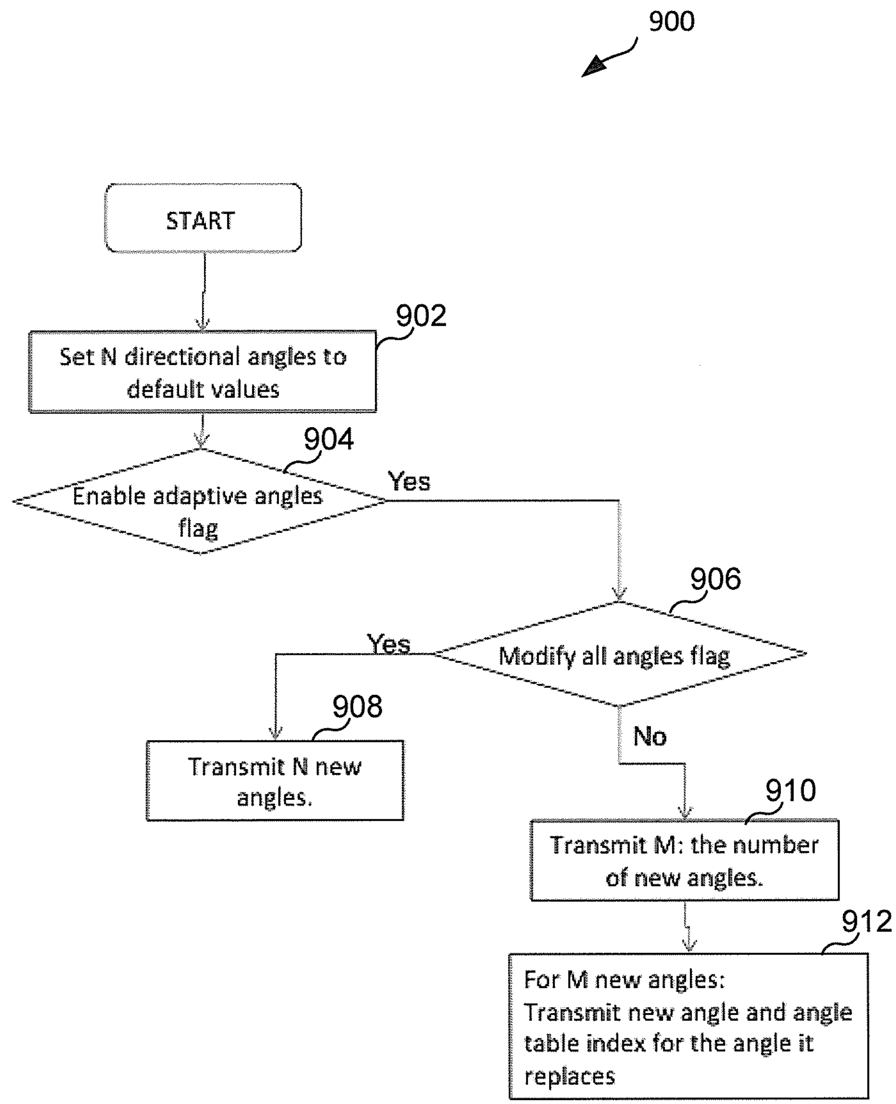
FIG. 9 illustrates a process for transmission of new angles according to embodiments of the present disclosure.

FIG. 9 illustrates a process 900 for transmission of new angles according to embodiments of the present disclosure. The embodiment of process 900 shown in FIG. 9 is for illustration only. Other embodiments of process 900 could be used without departing from the scope of this disclosure.

Various embodiments of this disclosure provide adaptive angles and methods for achieving adaptive angles. In FIG. 9, at operation 902, a processor sets N directional angles to default values. If adaptive angles are desired, at operation 904, a flag is transmitted to indicate adaptive angles. There are two options to update the angles: modify all angles or modify a subset of angles. At operation 906, the processor determines whether a flag to modify all angles is enabled. If modify all angles flag is enabled, at operation 908, the processor controls a transceiver to transmit the N new angles. If a subset of angles is to be updated, at operation 910, the processor controls a transceiver to transmit M number of angles to be updated. At operation 912, for each of the M angles to be updated, the processor controls the transceiver to transmit an angle table index and the new angles. In one or more embodiments, the flags, number of new angles, angle, and other information can be transmitted using entropy coding, e.g. Context-adaptive binary arithmetic coding (CABAC) or Context-adaptive variable-length coding (CAVLC).

Different embodiments of this disclosure can provide other methods for transmission of adaptive angles, such as updating the first P angles or the last Q angles or the middle L angles. The adaptive angles can be achieved at a sequence level, picture level, slice level, tile level, or on any region of image. Different portions of the image can use a different set of angles.

Various embodiments of this disclosure provide improved entropy coding of angular mode information.

FIG. 8 illustrates one way of entropy coding of intra mode information for finer angles. With finer angles, around 67% of the rem_intra_luma_pred_mode angular modes are within +/−16 of MPM[2]. One or more embodiments of this disclosure defines the following mapping for coding of rem_intra_luma_pred_mode so that this correlation can be used to improve coding efficiency: new_rem_intra_luma_pred_mode=(rem_intra_luma_pred_mode−MPM[2]+16) & 0x3F. This equation is an example for an example when 65 angles are used. The equation can be appropriately modified when the number of angles is different. For example, when the number of angles is 129 the equation can be new_rem_intra_luma_pred_mode=(rem_intra_luma_pred_mode−MPM[2]+32) & 0x7F By using this mapping, the probability of the first bin (or bit) being equal to 0 is higher than being equal to 1 since +/−16 of MPM[2] maps to 0 to 31 of new_rem_intra_luma_pred_mode. To exploit this redundancy, new_rem_intra_luma_pred_mode is then CABAC coded using context coding for the first bin. In HEVC, rem_intra_luma_pred_mode is directly coded using bypass coding.

Figure 10:
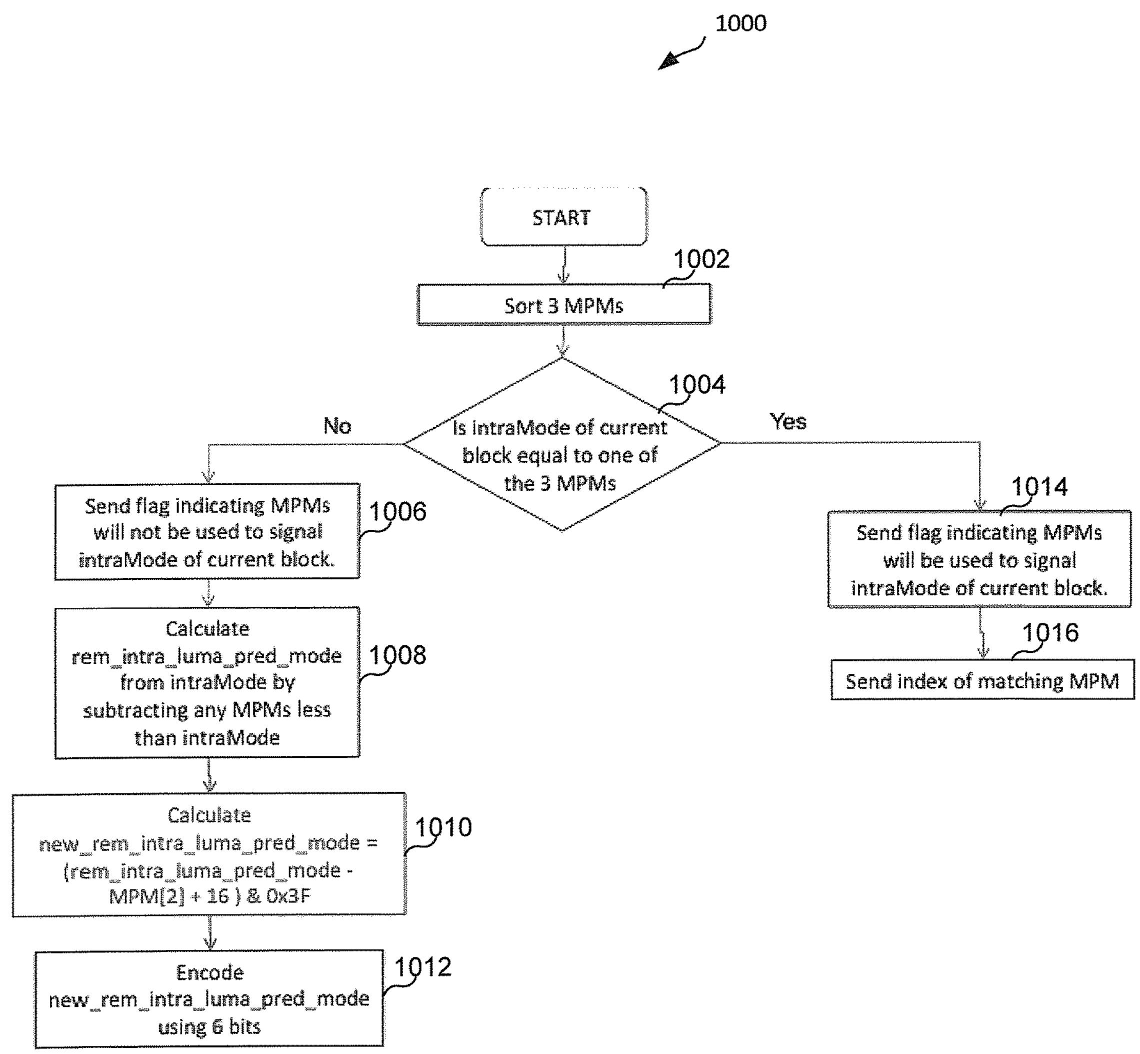
FIG. 10 illustrates a process for improved entropy coding of angular mode information according to embodiments of the present disclosure.

FIG. 10 illustrates a process 1000 for improved entropy coding of angular mode information according to embodiments of the present disclosure. The embodiment of process 1000 shown in FIG. 10 is for illustration only. Other embodiments of process 1000 could be used without departing from the scope of this disclosure.

In FIG. 10, at operation 1002, a processor sorts three MPMs. At operation 1004, the processor determines whether the intra mode of the current block is equal to one of the three MPMs. If the intra mode of the current block is not equal to one of the three MPMs, at operation 1006, the processor controls a transceiver to send a flag indicating that MPMs will not be used to signal an intra mode of the current block.

At operation 1008, the processor determines a rem_intra_luma_pred_mode, the luma intra mode, from the intra mode by subtracting any MPMs less than the intra mode. At operation 1010, the processor calculates a new_rem_intra_luma_pred_mode (rem_intra_luma_pred_mode−MPM[2]+16) & 0x3F. At operation 1012, the processor encodes the new_rem_intra_luma_pred_mode using six bits.

At operation 1004, if the intra mode of the current block is equal to one of the three MPMs, at operation 1014, the processor controls a transceiver to send a flag indicating that MPMs will be used to signal an intra mode of the current block. At operation 1016, the processor controls a transceiver to send an index of matching MPMs.

Figure 11:
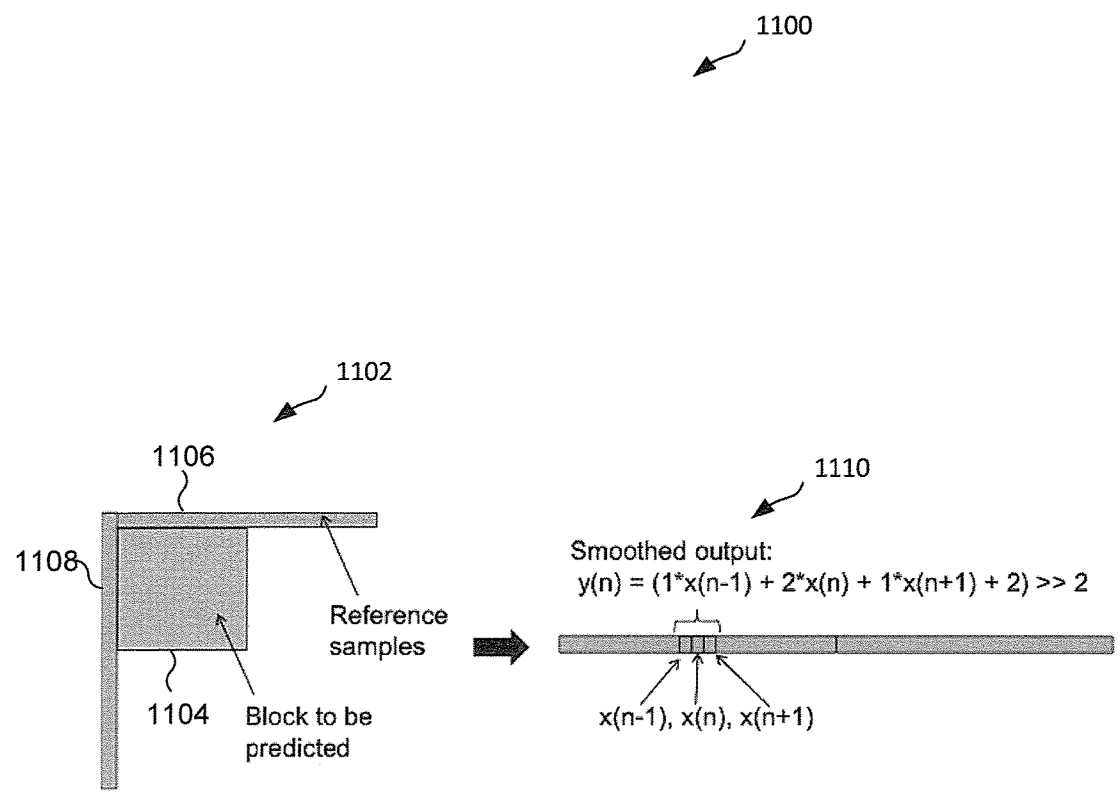
FIG. 11 illustrates a process for intra smoothing with longer and stronger smoothing filters according to embodiments of the present disclosure.

FIG. 11 illustrates a process 1100 for intra smoothing with longer and stronger smoothing filters according to embodiments of the present disclosure. The embodiment of process 1100 shown in FIG. 11 is for illustration only. Other embodiments of process 1100 could be used without departing from the scope of this disclosure.

Various embodiments of this disclosure provide longer and stronger intra smoothing filters for larger block sizes (16×16 and 32×32). HEVC uses [1 2 1]/4 filter for smoothing reference samples. Filtering improves prediction quality leading to compression efficiency. In HEVC, the left and top reference samples are clubbed together and filtered using [1 2 1]/4 filter. Let y(n) denote the smoothed signal. y(n) is given by y(n)=(1*x(n−1)+2*x(n)+1*x(n+1)+2)>>2. As the video resolution increases, a longer filter can provide the same coverage as a smaller filter on a lower resolution image. Also when there are details in the image, smaller block sizes can be used. The larger blocks can be used for smoother blocks.

At illustration 1102, a block 1104 to be predicted is near top reference samples 1106 and left reference samples 1108. At illustration 1110, a smoothed input is shown.

An embodiment of this disclosure provides longer and stronger intra smoothing filters to better filter larger block sizes. Improved filtering can improve prediction quality leading to compression efficiency. Longer and stronger intra smoothing filters such as [1 2 3 4 3 2 1]/16 or [1 2 2 2 1]/8 are used in various embodiments of this disclosure.

The output smoothed signal when [1 2 2 2 1]/8 filter is used is given by y(n)=(1*x(n−2)+2*x(n−1)+2*x(n)++2*x(n+1)+1*x(n+2)+4)>>3.

The output smoothed signal when [1 2 3 4 3 2 1]/16 filter is used is given by y(n)=(1*x(n−3)+2*x(n−2)+3*x(n−1)+4*x(n)++3*x(n+1)+2*x(n+2)+1*x(n+3)+8)>>4.

Figure 12:
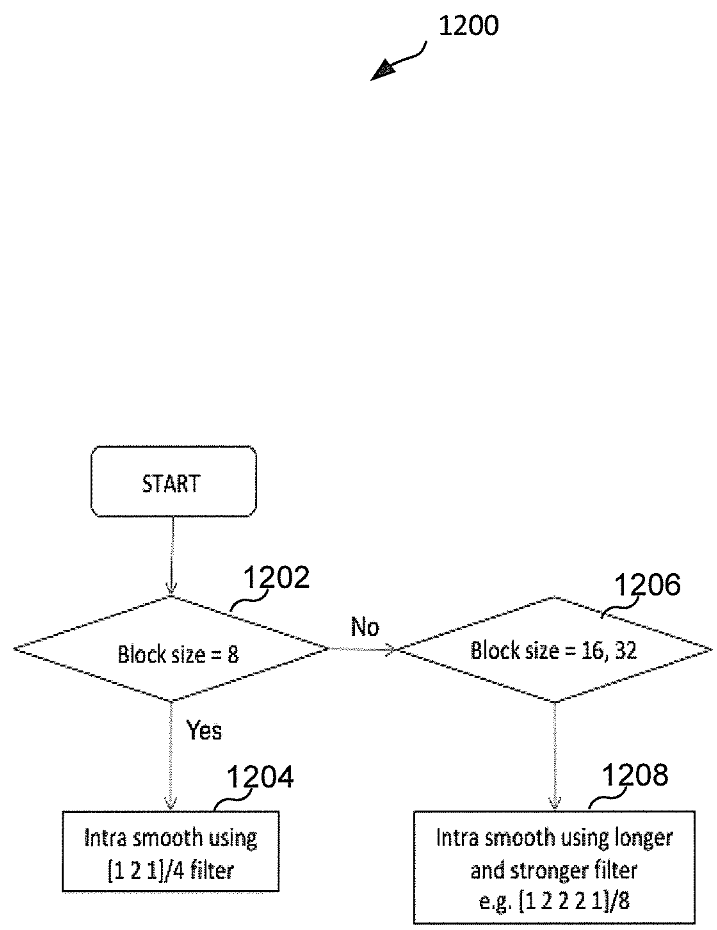
FIG. 12 illustrates a process for intra smoothing according to embodiments of the present disclosure.

FIG. 12 illustrates a process 1200 for intra smoothing according to embodiments of the present disclosure. The embodiment of process 1200 shown in FIG. 12 is for illustration only. Other embodiments of process 1200 could be used without departing from the scope of this disclosure.

In FIG. 12, a processor, at operation 1202, determines whether a block size is equal to eight. If the block size is equal to eight, at operation 1204, the processor performs intra smoothing using a [1 2 1]/4 filter. If the block size is not equal to eight, at operation, 1106, the processor determines whether the block size is equal to sixteen or thirty-two. If the block size is equal to sixteen or thirty-two, at operation 1108, the processor performs intra smoothing using a longer and stronger filter, e.g., [1 2 2 2 1]/8 filter.

Figure 13:
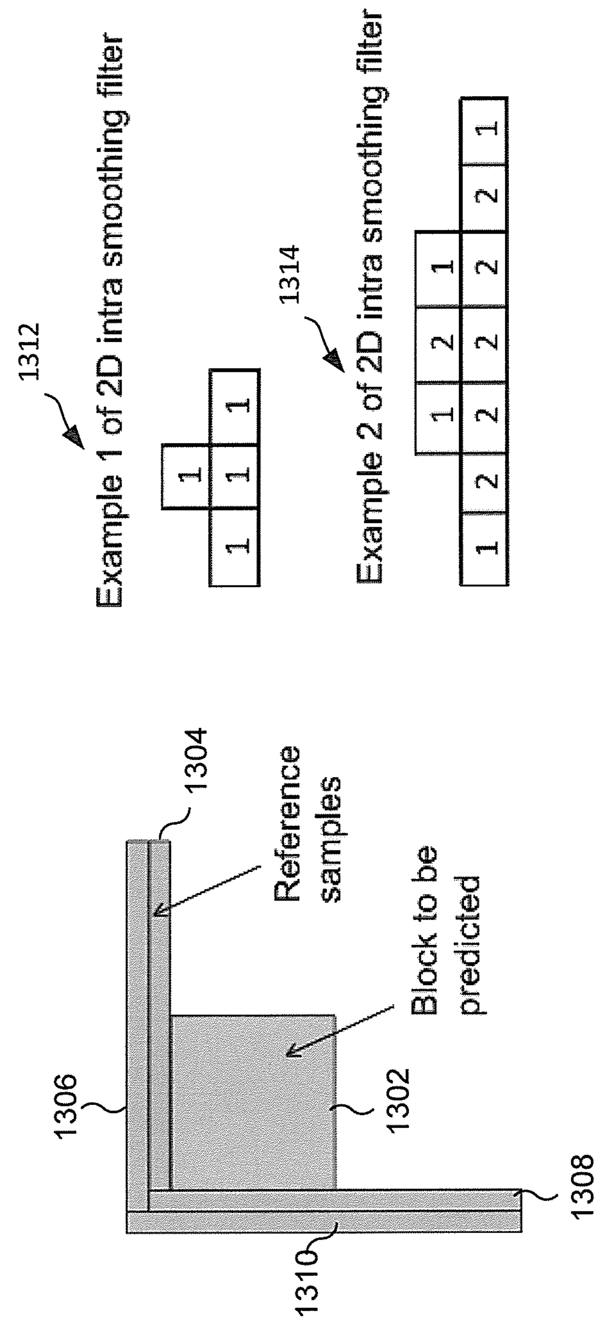
FIG. 13 illustrates a block 1302 to be predicted according to embodiments of the present disclosure.

FIG. 13 illustrates a block 1302 to be predicted according to embodiments of the present disclosure. The embodiment of block 1302 shown in FIG. 13 is for illustration only. Other embodiments of block 1302 could be used without departing from the scope of this disclosure. Block 1302 is to be predicted using reference samples 1304-1310. In FIG. 13, reference sample 1304 is a first level top reference sample, reference sample 1306 is a second level top reference sample, reference sample 1308 is a first level left reference sample, and reference sample 1310 is a second level left reference sample.

Intra smoothing filter 1312 is one example of an intra smoothing filter. Intra smoothing filter 1314 is another example of an intra smoothing filter.

Angular prediction can also be similarly extended to use 2 rows and 2 columns by using 2D interpolation filters.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment, comprising:
- a transceiver configured to receive an encoded bitstream of video; and
- a decoder comprising processing circuitry configured to:
  - identify a first intra mode associated with a top prediction unit (PU) in relation to a current PU of the encoded bitstream of video;
  - identify a second intra mode associated with a left PU in relation to the current PU; and
  - determine a plurality of most probable modes (MPMs) based on the first intra mode and the second intra mode,
- wherein a number of modes is greater than thirty-five;
- wherein the first or second intra mode is greater than two, and
- wherein the plurality of MPMs is given by:
  - MPM[0]=a selected mode of one of the first or second intra modes that is greater than two;
  - MPM[1]=2+(the selected mode+61) % 64); and
  - MPM[2]=2+(the selected mode−1) % 64).

2. The user equipment of claim 1, wherein the number of the MPMs is sixty-five.

3. The user equipment of claim 1, wherein the decoder is further configured to:
- decode information indicating whether an intra mode of the current PU is equal to one of the MPMs; and
- when the intra mode of the current PU is not equal to any of the plurality of MPMs, determine a remaining intra mode by comparing the intra mode of the current PU to the plurality of MPMs, wherein the remaining intra mode is coded using six bits.

4. The user equipment of claim 3, wherein the decoder is further configured to:
- determine a new remaining intra mode, wherein the new remaining intra mode is given by:
- new_rem_intra_luma_pred_mode=(rem_intra_luma_pred_mode−MPM[2]+16) & 0x3F,
- where new_rem_intra_luma_pred_mode is the new remaining intra mode, where rem_intra_luma_pred_mode is the remaining intra mode, and where MPM[2] is a one of the plurality of MPMs, and
- wherein at least one bin of the new_rem_intra_luma_pred_mode is coded using Context-adaptive binary arithmetic coding (CABAC).

5. The user equipment of claim 1, wherein the decoder is further configured to:
- determine a block size of the current PU;
- when the block size is 8, perform intra smoothing using a [1 2 1]/4 filter; and
- when the block size is 16 or 32, perform intra smoothing using a [1 2 2 2 1]/8 filter or [1 2 3 4 3 2 1]/16 filter.

6. The user equipment of claim 5, wherein the [1 2 2 2 1]/8 filter is given by:

$$y(n)=(1*x(n-2)+2*x(n-1)+2*x(n)++2*x(n+1)+1*x(n+2)+4)>>3.$$

7. The user equipment of claim 5, wherein the [1 2 3 4 3 2 1]/16 filter is given by:

$$y(n)=(1*x(n-3)+2*x(n-2)+3*x(n-1)+4*x(n)++3*x(n+1)+2*x(n+2)+1*x(n+3)+8)>>4.$$

8. The user equipment of claim 1, wherein the transceiver is further configured to receive a set of angles, where the set of angles is one of a set of all new angles or a set of partially new angles.

9. The user equipment of claim 1, wherein the decoder is further configured to:
- perform intra smoothing using two levels of reference samples.

10. A method for decoding a bitstream of video, comprising:
- receiving an encoded bitstream of video; and
- identifying a first intra mode associated with a top prediction unit (PU) in relation to a current PU of the encoded bitstream of video;
- identifying a second intra mode associated with a left PU in relation to the current PU; and
- determining a plurality of most probable modes (MPMs) based on the first intra mode and the second intra mode,
- wherein a number of modes is greater than thirty-five;
- wherein the first or second intra mode is greater than two, and
- wherein the plurality of MPMs is given by:
  - MPM[0]=a selected mode of one of the first or second intra modes that is greater than two;
  - MPM[1]=2+(the selected mode+61) % 64); and
  - MPM[2]=2+(the selected mode−1) % 64).

11. The method of claim 10, wherein the number of the MPMs is sixty-five.

12. The method of claim 10, further comprising:
- decoding information indicating whether an intra mode of the current PU is equal to one of the MPMs; and when the intra mode of the current PU is not equal to any of the plurality of MPMs, determining a remaining intra mode by comparing the intra mode of the current PU to the plurality of MPMs, wherein the remaining intra mode is coded using six bits.

13. The method of claim 12, further comprising:

determining a new remaining intra mode, wherein the new remaining intra mode is given by:

new_rem_intra_luma_pred_mode=(rem_intra_luma_pred_mode−MPM[2]+16) & 0x3F, where new_rem_intra_luma_pred_mode is the new remaining intra mode, where rem_intra_luma_pred_mode is the remaining intra mode, and where MPM[2] is a one of the plurality of MPMs, and wherein at least one bin of the new_rem_intra_luma_pred_mode is coded using Context-adaptive binary arithmetic coding (CABAC).

14. The method of claim 10, further comprising:

determining a block size of the current PU;

when the block size is 8, perform intra smoothing using a [1 2 1]/4 filter; and when the block size is 16 or 32, perform intra smoothing using a [1 2 2 2 1]/8 filter or [1 2 3 4 3 2 1]/16 filter.

15. The method of claim 14, wherein the [1 2 2 2 1]/8 filter is given by:

$$y(n)=(1*x(n-2)+2*x(n-1)+2*x(n)++2*x(n+1)+1*x(n+2)+4)>>3.$$

16. The method of claim 14, wherein the [1 2 3 4 3 2 1]/16 filter is given by:

$$y(n)=(1*x(n-3)+2*x(n-2)+3*x(n-1)+4*x(n)++3*x(n+1)+2*x(n+2)+1*x(n+3)+8)>>4.$$

17. The method of claim 10, further comprising:

receiving a set of angles, where the set of angles is one of a set of all new angles or a set of partially new angles.

18. The method of claim 10, further comprising:

performing intra smoothing using two levels of reference samples.

* * * * *